Sept. 28, 1971 JUN SHIMOMURA 3,608,460
BUILT-IN EXPOSURE METER OF SINGLE LENS REFLEX CAMERA
Filed Feb. 24, 1969 2 Sheets-Sheet 1

INVENTOR
JUN SHIMOMURA

BY Harry S. Shapiro

ATTORNEY

United States Patent Office 3,608,460
Patented Sept. 28, 1971

3,608,460
BUILT-IN EXPOSURE METER OF SINGLE LENS
REFLEX CAMERA
Jun Shimomura, Tokyo, Japan, assignor to Nippon
Kogaku K.K., Tokyo, Japan
Filed Feb. 24, 1969, Ser. No. 801,433
Claims priority, application Japan, Feb. 29, 1968,
43/15,480
Int. Cl. G03b 7/00, 19/12
U.S. Cl. 95—42
5 Claims

ABSTRACT OF THE DISCLOSURE

A single lens reflex camera having a built-in exposure meter and having the limited space due to the necessarily large housing for the rotatable mirror utilizes the space at the bottom of the camera, between the bottom wall of the camera and the bottom wall of the mirror housing, for the location of the variable resistor and its cooperable brush contact in the circuit of the exposure meter. The resistor and brush are each mounted on a gear. One gear is cooperable with the camera's stop setting member and the other gear is cooperable with the shutter speed setting member.

---

Figure 1:
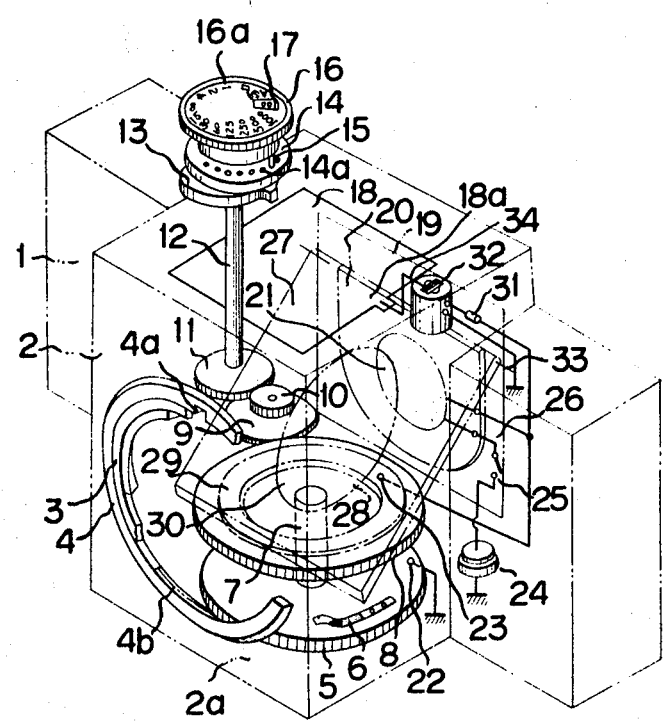

This invention relates to a built-in exposure meter for a single lens reflex camera.

In building an exposure meter into a single lens reflex camera having a focal plane shutter, it is difficult to assemble members of precise and easily manufactured dimensions in the limited space available regardless of the type of the calculating mechanism to be employed because the camera has a mirror box which occupies a large space at the center portion.

Where the calculating mechanism for the exposure meter uses flexible members, considerable space in front of and above the mirror box is necessary. When a variable resistor is provided above the penta prism of the view finder, the camera is top-heavy with the result that the optimum condition for holding the camera for phototaking is not furnished. Also, the forward protrusion of the lens mount portion and its extension in the direction of the diameter around the lens mount is unavoidable.

When an exposure meter is provided with a pointer matching cam device and a meter revolving device, the dimensions of the exposure meter provide a problem because it is impossible to build an exposure meter which is of greater thickness than the camera body. In exposure meters using a variable resistor, an evaporated metal film has been used to furnish precision of resistance values and durability in mass production. In this kind of exposure meter, it is of course desirable that the amount of movement of the resistance body or brush associated with the variable resistor be as large as possible to afford suitable manufacturing tolerances and control. The amount or length of movement of the brush is related to the exposure factor setting member, or the stop value on the shutter speed setting member, which is changed by each step on the scale for the exposure factor setting member. Moreover, the exposure meter should be constructed to permit precise, simple and easy assembly and adjustment when the components are assembled within the camera in combination with the meter's photosensitive element and exposure calculating mechanism. For durability and reliability, the contact surfaces of the brush and the resistor must be protected from dust.

An object of the invention is to provide a single lens reflex camera with an exposure calculating mechanism which is large enough to provide precision light measurement and reliability, the construction of the built-in exposure meter being such that simplified assembly, inspection, adjustment, and the ability to replace parts when needed, are afforded.

The built-in exposure meter of a single lens reflex camera is constructed with an interlocking ring related to the exposure factors of an interchangeable lens such as stop value, full open aperture, and diaphragm correction value against a standard lens, the ring being positioned on the lens mount portion on the front of the camera in such a manner that the ring may rotate around the optical axis of the lens. In accordance with the invention, two gears are provided which are located between the bottom wall of the camera and the bottom wall of the mirror housing. In this space, two gears are positioned. One gear is interlocked with the interlocking ring or stop setting member. The second gear is cooperable with the shutter speed setting member. The two gears, which are opposite to each other and rotatable are related so that the rotary motion of either of them affects the film setting speed. A variable resistor is secured to one gear and the brush contact for the resistor is secured to the other gear. Preferably, the variable resistor is mounted on the underside of the gear which is cooperable with the shutter speed setting member and the brush is mounted on the upper side of the gear which is cooperable with the stop setting member or interlocking ring.

The advantages of the present invention are as follows:

(1) No special space is required as compared with conventional devices in which space must be provided around the lens mount portion.

(2) The space in the front half of the mirror box bottom portion which normally possesses some space in a single lens reflex camera can be used effectively.

(3) Since both the resistor plate and the brush may have large diameters as compared with the diameters of these components in known devices for example, where these elements are placed under the shutter dial, as a result, a larger amount of movement of the brush per step of the exposure factor setting member is permitted thereby furnishing ease and simplicity in manufacturing coupled with improved precision in light measurement.

(4) In known devices where parts of the exposure meter are positioned around the lens mount portion, it is necessary to remove the lens mounting bayonet to inspect or to replace such parts. Since the exposure meter system according to this invention is located under the bottom of the mirror box, inspection, repairs, and parts replacement can be accomplished very easily by merely removing either the bottom plate or the bottom cover.

(5) In an exposure meter system constructed so that its light receiving part is in the interior of the mirror box, almost all parts of the built-in exposure meter can be mounted to the mirror box. This enables each unit to be assembled and adjusted easily.

(6) Since there is less likelihood for dust to adhere to the surface of the resistor body when the camera is at normal operating position (horizontal or vertical position), troubles such as incomplete contact and short life rarely occurs and, as a result, reliability is improved.

Figure 2:
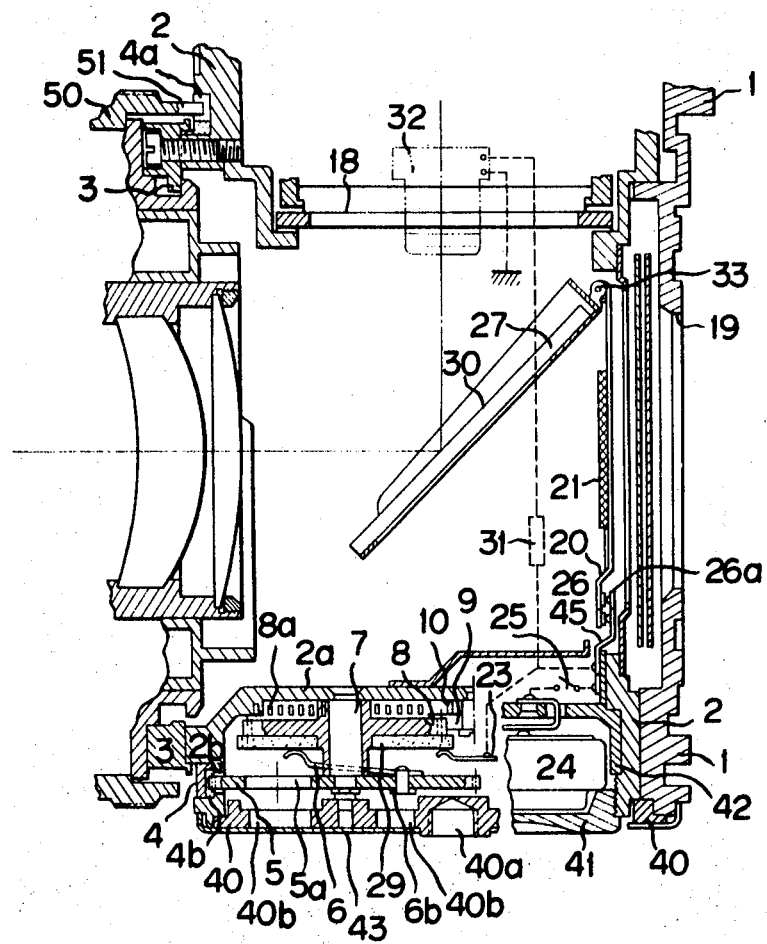

The invention will be described with reference to a preferred embodiment thereof illustrated in the drawings, in which:

FIG. 1 is a perspective view of a camera having a built-in exposure meter in accordance with the invention; and FIG. 2 is an enlarged vertical cross sectional view of the significant portion of FIG. 1.

Referring to FIGS. 1 and 2, a camera body 1 has a mirror box or housing 2 positioned therein at approximately the center portion thereof. As known in the art, the mirror housing has a film frame opening 19 at its rear side, a finder focusing screen 18 on top, and a lens mounting bayonet 3 on its front side. In the interior of the housing, a reflecting mirror 27 is pivoted for rotation on a shaft 33. A portion 30 of the mirror is made semi-transparent in order to transmit light to a light receiving body or photosensitive element 21 mounted on a supporting plate 20. The supporting plate is rotatably mounted for rotation with the mirror 27. As shown in FIG. 2, when the mirror is positioned at approximately 45°, the supporting plate is positioned in front of the film frame opening 19 in substantial parallelism with the surface of a film (not shown), and the light passing through the lens is received by the light receiving body 21. When the mirror is rotated to phototaking position, the supporting plate is also raised toward the finder screen 18 to cover the rear surface of the mirror. In such position, the supporting plate blocks the incident light which would pass through the finder screen and the semi-transparent mirror toward the film.

As shown in FIG. 2, the lens bayonet 3, which is in front of the mirror housing or box 2, is fitted with a rotatable diaphragm interlocking ring or stop setting member 4. The ring is formed with a notch 4a to receive a projection 51 provided on a diaphragm ring 50 of an interchangeable lens. The diaphragm interlocking ring 4 has a crown gear 4b secured to the rear side thereof, such gear being in meshing engagement with a gear 5 mounted on the lower end of a shaft 7. The gear 5 is positioned near the bottom 2a of the mirror housing 2, and the axis of rotation of the shaft 7 is substantially perpendicular to the optical axis of the lens. The plane of rotation of the gear 5 is substantially parallel to the bottom 2a of the mirror housing, and the gear is located in the small space 2b between the bottom 2a of the housing and the bottom plate 40 of the camera body. A gear 8 is mounted on the shaft 7 opposite to the gear 5 so that the gear 8 is rotated upon rotation of the gear 5. (In FIG. 1, the gear 8 is shown lifted to a position which is somewhat higher than its actual position as illustrated in FIG. 2, so that the brush contact 6, to be subsequently described, may better be seen.)

The gears 5 and 8 serve as carriers for a brush 6 and a variable resistor 29. Preferably, and in accordance with the illustrated embodiment of the invention, the brush contact 6 is fixed to the upper face of the gear 5 by a connector 6b, and the resistor 29 is secured to the lower face of the gear 8 so that the brush and resistor are in engagement. As shown in FIG. 2, the gear 5 has an aperture 5a therethrough, the aperture being spaced from the connector 6b for the brush. The aperture facilitates inspection of the contact portion of the brush and of the resistor.

As best shown in FIG. 1, the gear 8 is interlocked with a film speed indicating plate 17 in the shutter speed dial 16 by means of intermediate gears 9, 10, 11 and the movable shaft 12, the gear 9 being in meshing engagement with the gear 8. As shown in FIG. 2, a spring 8a connected at one end to the bottom wall 2a of the mirror housing is associated with the gear 8 to take up any slack or tendency of the gears 8, 9, 10 and 11 to become disengaged. A cam 13 mounted on top of the shaft 12 furnishes the shutter speed change means. The cam is secured to and combined with the film speed setting plate 14 above it. A shutter speed dial 16 and the film speed indicating plate 17 are related to be rotated as a unit when the circumferential portion 16a of the shuter speed dial is lifted and rotated until a pin 15 drops into a hole 14a of the film speed setting plate 14.

Referring to FIG. 1, and with the mirror housing viewed from the front as shown, the right side of the mirror housing has assembled therein the exposure meter circuit comprising a meter 32, a resistor 31 and a power source or battery 24. A needle 34 of the meter can be seen in the index portion 18a of the finder focusing screen 18. Terminals 22, 23 and 26 are respectively connected to the gears 5 and 8 and the supporting plate 20 to place the light receiving body 21 in the exposure meter circuit.

Referring to FIG. 2, and as previously indicated, the bottom plate 40 of the camera is beneath and in spaced relation with respect to the bottom wall 2a of the mirror housing 2. A tripod socket 40a is formed in the camera's bottom plate 40. A pair of spaced holes 40b extends through the bottom plate 40. A bottom cover 43 is removably fitted to the bottom plate. The holes 40b and the hole 5a extending through the gear 5 enable and facilitate the inspection and adjustment of the brush connector 6b and the contact portion of the brush and of the resistor 29. As shown in FIG. 2, a cover 41 is provided for a case 42 for the battery 24 at the bottom of the mirror housing. The cover permits access to the battery for replacement. The battery case 42 is made of suitable insulating material such as a synthetic resin, and is formed to support at one end thereof a contact piece 45 having a terminal 26a. Such terminal contacts the terminal 26 of the plate 20 which supports the photosensitive element 21 only when the element is in light measuring position as shown in FIG. 2. Such arrangement of the parts furnishes a highly compact or space saving exposure meter unit.

With the device of the invention as hereinbefore described, exposure adjustment is performed by the motion that determines the relative rotative positions of the gear 5 having the brush 6 thereon and the gear 8 having the cooperable resistor 29 thereon. The position to which the gear 5 is rotated depends upon the full open aperture of the lens and on various amounts of correction associated with the diaphragm. The position to which the gear 8 is rotated depends upon the sum of the set values of shutter speed and film speed. The described elements and their relationship to one another eliminates the need for a differential mechanism within the camera body.

It is believed that the advantages and improved results provided by the device of the invention will be apparent from the foregoing detailed description. Various modifications and changes may be made without departing from the spirit and scope of the invention as set forth in the following claims.

What is claimed is:

1. A single lens reflex camera having a built-in exposure meter comprising an exposure meter circuit including a photosensitive element responsive to the intensity of light from a subject, and a variable resistor and a brush contact in engagement therewith, a rotatable stop setting member, a stop setting gear fixed for rotation with the stop setting member, a shutter speed setting member, a mirror housing in the camera body, the bottom wall of the housing and the bottom wall of the camera body being in spaced relation, a mirror within the housing rotatable between viewing and photographing positions, a shaft extending between said bottom walls, a first gear mounted on the shaft in meshing engagement with said stop setting gear, a second gear mounted on the shaft in coaxial relation with and adjacent the first gear, the rotation of the second gear being responsive to the rotation of the first gear, the plane of rotation of the gears being substantially parallel to the planes of said bottom walls, and means connecting the second gear to the shutter speed setting member, said variable resistor and brush contact being respectively connected to the facing sides of the first and second gears.

2. A single lens reflex camera according to claim 1 wherein the brush contact is connected to the first gear and the resistor is connected to the second gear.

3. A single lens reflex camera according to claim 2 wherein the bottom wall of the camera body is provided with a pair of spaced openings extending therethrough, an opening extending through said first gear, and a removable plate covering the bottom wall of the camera body, whereby access is provided to the contact end and the connected end of the brush contact.

4. A single lens reflex camera according to claim 1 wherein a casing for an electrical source of energy for the exposure meter circuit is positioned between the bottom wall of the mirror housing and the bottom wall of the camera body; wherein the photo-sensitive element is mounted upon an electrically conductive supporting plate rotatable with the mirror; and wherein the supporting plate is in circuit with terminals on the casing and said first and second gears.

5. A single lens reflex camera according to claim 3 wherein a casing for an electrical source of energy for the exposure meter circuit is positioned between the bottom wall of the mirror housing and the bottom wall of the camera body; wherein the photo-sensitive element is mounted upon an electrically conductive supporting plate rotatable with the mirror; and wherein the supporting plate is in circuit with terminals on the casing and said first and second gears.

References Cited
UNITED STATES PATENTS 3,461,783   8/1969   Fujii _____ 95—10

SAMUEL S. MATTHEWS, Primary Examiner

R. L. MOSES, Assistant Examiner

U.S. Cl. X.R.

95—64R